US012323768B2

(12) United States Patent
Wagner et al.

(10) Patent No.: US 12,323,768 B2
(45) Date of Patent: Jun. 3, 2025

(54) METHOD FOR AUDIO SIGNAL PROCESSING ON A HEARING SYSTEM, HEARING SYSTEM AND NEURAL NETWORK FOR AUDIO SIGNAL PROCESSING

(71) Applicant: SONOVA AG, Staefa (CH)

(72) Inventors: Paul Wagner, Portland, OR (US); Sebastian Kroedel, Erlenbach (CH); Claudio Santelli, Staefa (CH); Markus Hofbauer, Hombrechtikon (CH); Manon Barbier, Soultzmatt (FR)

(73) Assignee: Sonova AG, Staefa (CH)

( * ) Notice: Subject to any disclaimer, the term of this patent is extended or adjusted under 35 U.S.C. 154(b) by 351 days.

(21) Appl. No.: 18/089,093

(22) Filed: Dec. 27, 2022

(65) Prior Publication Data

US 2023/0209283 A1 Jun. 29, 2023

(30) Foreign Application Priority Data

Dec. 29, 2021 (EP) .................................... 21218086

(51) Int. Cl.
*H04R 25/00* (2006.01)

(52) U.S. Cl.
CPC ......... *H04R 25/507* (2013.01); *H04R 25/606* (2013.01)

(58) Field of Classification Search
CPC ............... H04R 25/505; H04R 25/507; H04R 2225/41; H04R 2225/43; H04R 2225/59
See application file for complete search history.

(56) References Cited

U.S. PATENT DOCUMENTS

| | | | | |
|---|---|---|---|---|
| 9,886,954 | B1 * | 2/2018 | Meacham | G10L 21/028 |
| 10,003,895 | B2 * | 6/2018 | Fung | H04R 25/507 |
| 10,142,745 | B2 * | 11/2018 | Petersen | H04R 25/552 |
| 10,332,537 | B2 * | 6/2019 | Shih | G06F 3/162 |
| 10,535,362 | B2 * | 1/2020 | Bryan | G10L 21/0364 |
| 10,681,459 | B1 * | 6/2020 | Breitenmoser | H04R 25/30 |
| 11,356,783 | B2 * | 6/2022 | Pedersen | H04R 25/43 |
| 11,375,322 | B2 * | 6/2022 | Lunner | H04R 25/505 |

(Continued)

OTHER PUBLICATIONS

"Extended European Search Report received in EP Application No. 21218086 on Aug. 23, 2022".

(Continued)

*Primary Examiner* — Ryan Robinson
(74) *Attorney, Agent, or Firm* — ALG Intellectual Property, LLC

(57) ABSTRACT

Methods, hearing systems and neural networks for audio signal processing are described. A hearing system comprises a neural network. An input audio signal is processed into an output audio signal at least partially by means of a processing unit of the hearing system. The audio signal processing of the input audio signal includes executing audio signal processing by the neural network for performing a step of the audio signal processing, determining a confidence parameter resembling the reliability of the audio signal processing by the neural network and steering the audio signal processing in dependence of the confidence parameter. A particularly suitable neural network is configured to solve a regression-based acoustic processing task and additionally determining the confidence parameter.

15 Claims, 2 Drawing Sheets

(56) References Cited

U.S. PATENT DOCUMENTS

| | | | | |
|---|---|---|---|---|
| 11,457,320 | B2 * | 9/2022 | Breitenmoser | H04R 25/50 |
| 11,817,114 | B2 * | 11/2023 | Port | H03G 9/025 |
| 12,089,005 | B2 * | 9/2024 | Guo | H04R 25/305 |
| 2017/0278513 | A1 | 9/2017 | Li et al. | |
| 2021/0304736 | A1 | 9/2021 | Kothari et al. | |
| 2022/0312126 | A1 * | 9/2022 | Rosenthal | H04R 25/30 |
| 2024/0216179 | A1 * | 7/2024 | Herfort | A61F 11/145 |

OTHER PUBLICATIONS

"Partial European Search Report received in International Application No. 21218086.3, dated Jun. 20, 2022".
Braun, et al., "Towards Efficient Models for Real-Time Deep Noise Suppression", ICASSP 2021, Jun. 2021, pp. 656 to 660, doi: 10.1109/ICASSP39728.2021.9413580.
Yong Xu, et al., "A Regression Approach to Speech Enhancement Based on Deep Neural Networks", IEEE/ACM Transactions on Audio, Speech, and Language Processing, vol. 23, No. 1, Jan. 1, 2015, pp. 7-19, USA, ISSN: 2329-9290, DOI:10.1109/TASLP.20L4. 2364452, *Section III*.

* cited by examiner

METHOD FOR AUDIO SIGNAL PROCESSING ON A HEARING SYSTEM, HEARING SYSTEM AND NEURAL NETWORK FOR AUDIO SIGNAL PROCESSING

RELATED APPLICATIONS

The present application claims priority to EP Patent Application No. EP21218086.3, filed Dec. 29, 2021, the contents of which are hereby incorporated by reference in their entirety.

BACKGROUND INFORMATION

Hearing devices and audio signal processing on hearing devices are known from the prior art. Neural networks may be used for audio signal processing on hearing device systems, e.g., for classification of audio signals or enhancement of audio signals. In many situations, processing by neural networks yields superior results to conventional audio signal processing routines. However, while producing reliable results in most instances, neural network processing may fail for some audio signals, resulting in artefacts and/or negatively impacting the quality of the processed audio signals. In particular for high performing audio processing neural networks, there may be a relevant discrepancy in reliability of the network output based on the to be processed audio signals, in particular the complexity level of these audio signals.

BRIEF DESCRIPTION OF THE DRAWINGS

Details, features and advantages of the embodiments described herein are obtained from the description of exemplary embodiments with reference to the figures, in which.

DETAILED DESCRIPTION

Figure 1:
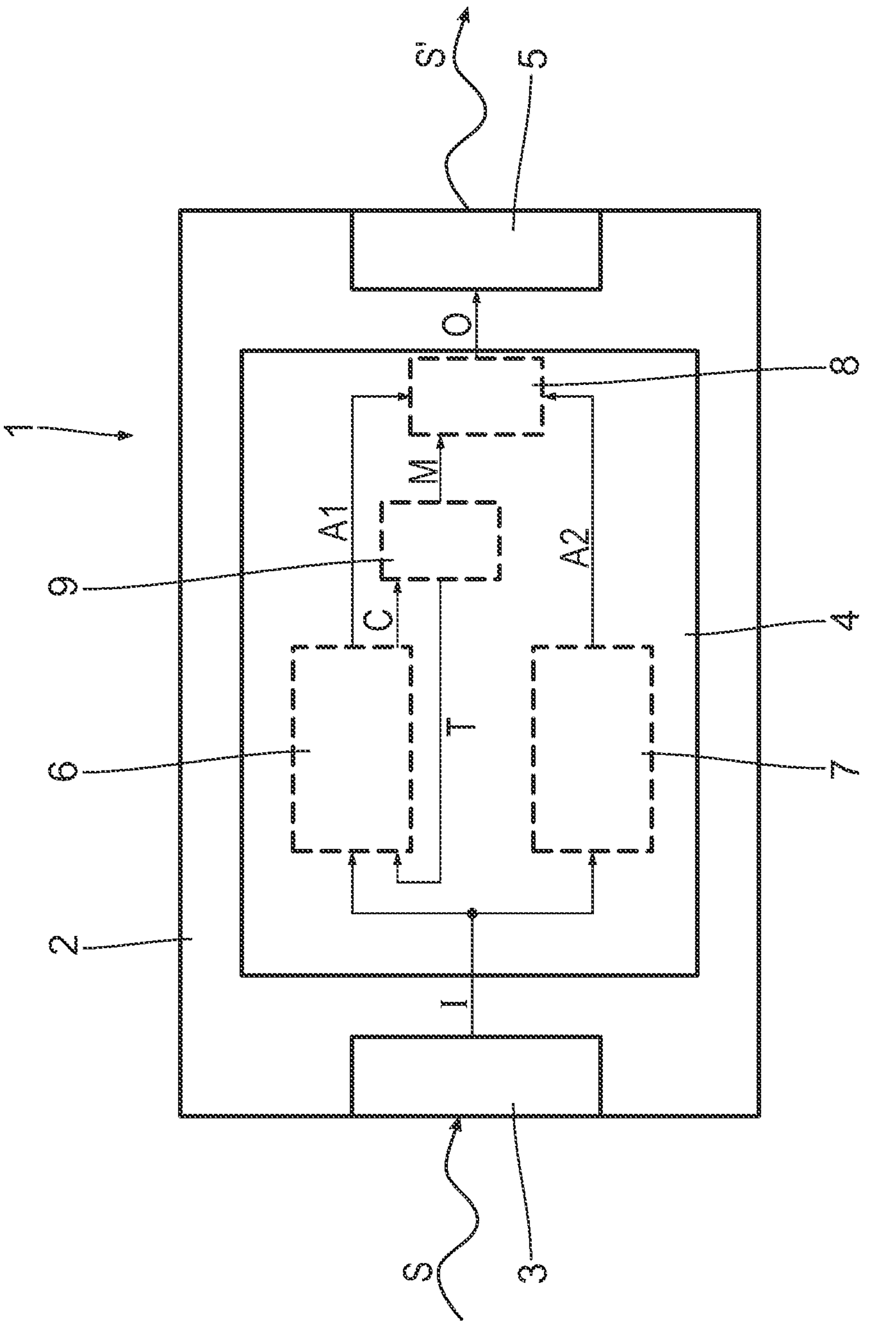
FIG. 1 shows a schematic depiction of a hearing system comprising a hearing device and a neural network for audio signal processing.

The embodiments described herein relate to a method for audio signal processing on a hearing system and a hearing system, in particular a hearing device system. The embodiments described herein further relate to a neural network for audio signal processing, in particular a neural network for regression-based acoustic processing of audio signals.

It is a feature of the present embodiments described herein to provide an improved method for audio signal processing on a hearing system, in particular a method which is less prone to detrimental effect of erroneous audio signal processing by a neural network.

In some examples, a hearing system has an audio input unit, a processing unit for audio signal processing and an audio output unit. The hearing system further comprises a neural network for audio signal processing. An input audio signal is received by means of the audio input unit. The input audio signal is processed into an output audio signal at least partially by means of the processing unit. The audio signal processing of the input audio signal includes executing audio signal processing by the neural network for performing a step of the audio signal processing, determining a confidence parameter resembling the reliability of the audio signal processing by the neural network, and steering the audio signal processing in dependence of the confidence parameter. The output audio signal is outputted by means of the audio output unit. Determining the confidence parameter, the method allows to monitor the reliability of the audio signal processing by the neural network. By steering the audio signal processing based on the confidence parameter, appropriate measures can be taken if the confidence parameter indicates a low reliability of the neural network processing, resulting in improved and more reliable audio signal processing. In particular, the method results in reliable audio signal processing even in instances where the neural network might lead to inferior results or even completely fail to process the audio signals. Thus, the method allows a more robust performance of the audio signal processing using the neural network. In particular, a wider variety of use cases can be processed by the hearing system including complex hearing scenarios in which the neural network per se would struggle. With this, the overall quality of the audio signal processing is increased. Artefacts, detrimental impact on intelligibly and/or other distracting behavior, such as for example dropping words randomly from a conversation, are reduced, in particular avoided. The outputted output audio signals have an overall better quality.

An advantageous aspect of the method is that the neural network, in particular the network weights, can be updated in the field without high performance risks.

A hearing system in the sense of the present embodiments is a system of one or more devices being used by a user, for example by a hearing impaired user, for enhancing his or her hearing experience. Enhancement of the hearing experience includes, but is not limited to condition a sound to be better receivable by the user, in particular by a hearing impaired user. Enhancement of the hearing experience may further include improving intelligibility and/or the general sound quality received by a user, such as the sound quality of music to which the user is listening. Exemplary devices of a hearing systems may include, but are not limited to table microphones, loudspeakers, in particular soundbars, headphones, earphones, headsets and/or hearing protection devices.

Exemplary hearing systems may comprise one or more hearing devices. Such hearing systems may be particularly suitable for improving the hearing experience of hearing impaired persons. A hearing system comprising one or more hearing devices is also referred to as a hearing device system.

A hearing device as in the context of the present embodiments can be a wearable hearing device, in particular a wearable hearing aid, or an implantable hearing device, in particular an implantable hearing aid, or a hearing device with implants, in particular a hearing aid with implants. An implantable hearing aid is, for example, a middle-ear implant, a cochlea implant, a brainstem implant or a bone-anchored hearing aid. A wearable hearing device is, for example, a behind-the-ear device, an in-the-ear device, a spectacle hearing device or a bone conduction hearing device. In particular, the wearable hearing device can be a behind-the-ear hearing aid, an in-the-ear hearing aid, a spectacle hearing aid or a bone conduction hearing aid. A wearable hearing device may further be headphones, ear phones, headsets and/or hearing protection devices. An exemplary headphone may be what is known as a hearable or smart headphone.

A hearing device system can comprise one or more hearing devices. For example, a hearing device system can comprise two hearing devices, in particular two hearing aids. The hearing devices may, for example, be wearable or implantable hearing devices associated with the left and right ear of a user, respectively.

Particularly suitable hearing systems, in particular hearing device systems, may comprise one or more peripheral devices. A peripheral device in the sense of the embodiments described herein is a device of a hearing system which is not a hearing device, in particular not a hearing aid. In particular, the one or more peripheral devices may comprise a mobile device, in particular a smartwatch, a tablet and/or a smartphone. The peripheral device may be realized by components of the respective mobile device, in particular the respective smartwatch, tablet and/or smartphone. Particularly in some examples, the standard hardware components of a mobile device are used for this purpose by virtue of an applicable piece of hearing system software, for example in the form of an app being installed and executable on the mobile device. Additionally or alternatively, the one or more peripheral devices may comprise a wireless microphone. Wireless microphones are assistive listening devices used by hearing impaired persons to improve understanding of speech in noisy surroundings and over distance. Such wireless microphones include, for example, body-worn microphones or table microphones. Other suitable peripheral devices may include, but are not limited to loudspeakers, e.g. soundbars, and/or TV connectors.

Exemplary hearing systems may comprise one or more hearing devices and one or more peripheral devices, such as a smartphone and/or a wireless microphone. The one or more hearing devices may be in data connection, in particular in wireless data connection, with the at least one peripheral device.

An audio signal may be any electrical signal, which carries acoustic information. In particular, an audio signal may comprise unprocessed or raw audio data, for example raw audio recordings or raw audio wave forms, and/or processed audio data, for example extracted audio features, compressed audio data, a spectrum, in particular a frequency spectrum, a cepstrum and/or cepstral coefficients. Different audio signals in the context of the embodiments described herein may be of different kind. For example, the input audio signal received by the audio input unit may be an unprocessed recording of ambient sound. The audio signal to be processed by the neural network, e.g. an audio signal input which is provided to the neural network's input, may be processed audio data, in particular may be in the form of the processed input audio signal. For example, the audio signal to be processed by the neural network may be based on a spectrum, in particular a frequency spectrum, of the input audio signal. For example, the input audio signal may be transformed by a Fast Fourier Transformation (FFT). The audio signal inputted to the neural network may comprise a cepstrum. For example, the audio signal inputted to the neural network may comprise Mel-Frequency Cepstral Coefficients (MFCC) and/or other cepstral coefficients.

An audio input unit may be any unit which is configured to receive an input audio signal. Receiving the input audio signal is to be understood in that the audio input unit provides the input audio signal based on data or signals received by the input audio signal. In particular, the audio input unit may be configured to generate the input audio signal based on other kinds of signals. For example, the input audio signal may be configured to transform an acoustic sound into the input audio signal. For example, the audio input unit may be configured for recording acoustic sound, in particular ambient sound, and transform the recorded sound into the input audio signal. The audio input unit may be in the form of an acoustic-electro transducer, e.g. a microphone. Additionally or alternatively, the audio input unit may be configured to directly receive an input audio signal. For example, the input audio signal may be provided, in particular generated, by another device and streamed, in particular wirelessly streamed, to the audio input unit. In this sense, the audio input unit may be configured as a data interface for receiving the input audio signal provided, in particular generated, by another device.

The audio output unit may be any unit which is configured for outputting the output audio signal. Outputting the output audio signal is to be understood in that the audio output unit provides data or signals based on the output audio signal. For example, the audio output unit may be configured to output acoustic sounds based on an audio signal. The output audio unit may be in the form of an electro-acoustic transducer, in particular a speaker and/or receiver. Additionally or alternatively, the audio output unit may be configured to stream, in particular to wirelessly stream, the output audio signal to another device, which, for example, may play back the output audio signal. For example, the output audio signal may be obtained by processing an input audio signal on a peripheral device, e.g. by executing a hearing system app on a mobile device, e.g. smartphone, and streamed to a hearing device, which plays back the output audio signal to a user. In this sense, the audio output unit may be configured as a data interface for transmitting the output audio signal to another device.

A processing unit of the hearing system may comprise a data storage and a computing device. A data storage in the sense of the embodiments described herein is a computer-readable medium. The computer-readable medium may be a non-transitory computer-readable medium, in particular a data memory. Exemplary data memories include, but are not limited to dynamic (DRAM) or static (SRAM) random access memories (RAM) or solid state drives (SSD) as well as hard drives and flash drives. The processing unit may be realized on a hearing device and/or a peripheral device of the hearing system, in particular the hearing device system. For example, it is possible to process audio signals on a peripheral device, e.g. by executing a hearing system app on a mobile device, e.g. a smartphone, and stream output audio signals to a hearing device which plays back the output audio signals to a user.

Computing routines, in particular audio signal processing routines which can be executed by the processing device, may be stored on the data storage. The audio processing routines may comprise conventional audio processing routines and/or neural networks for audio signal processing. In the context of the present embodiments, conventional audio signal processing and conventional audio signal processing routines are to be understood as an audio signal processing and audio signal processing routines not using methods of artificial intelligence, in particular neural networks, but can e.g. include digital audio processing. Conventional audio signal processing routines include, but are not limited to linear signal processing routines such as, e.g., Wiener filters and/or beamforming.

The computing device may execute one or more audio signal processing routines stored on the data storage of the hearing device. The computing device may comprise a general processor adapted for performing arbitrary operations, e.g. a central processing unit (CPU). The computing device may alternatively or additionally comprise a processor specialized on the execution of a neural network. In some examples, a computing device may comprise an AI chip for executing a neural network. AI chips can execute neural networks efficiently. However, a dedicated AI chip is not necessary for the execution of a neural network.

In the context of the present embodiments, the term “neural network” is to be understood as an artificial neural network, in particular a deep neural network (DNN). The neural network is configured for audio signal processing. When executed, the neural network performs a step of the audio signal processing. The neural network can be used to perform any suitable step of audio signal processing. For example, the neural network may be used for noise attenuation, in particular noise cancellation, speech enhancement, classification, in particular audio scene classification, source location, voice detection, in particular voice detection for detecting a user voice (also referred to as own voice detection or OV detection), signal separation, in particular sound source depended signal separation, such as, for example, speaker extraction and/or speaker separation, dereverberation, key word recognition, feedback cancellation and/or feature extraction. The neural network may process audio signals and result in a network output which may be used in the further processing steps in the audio signal processing on the processing unit of the hearing device. For example, a neural network for audio scene classification may return a classification parameter which resembles the predicted audio scene in which the user is in. Based on the classification parameter, the further audio signal processing on the hearing system, in particular on a hearing device of the hearing system, may be steered, in particular suitable audio processing routines may be chosen based on the classification parameter. Particularly in some examples, the neural network is configured to solve audio-related regression problems, such as noise cancellation, speech enhancement, dereverberation, signal separation, in particular sound source dependent signal separation, such as, for example, speaker extraction and/or speaker separation, and/or feedback cancellation, by performing regression-based acoustic processing. The regression-based acoustic processing may result in network output audio data which may be outputted by the neural network. Such network output audio data may comprise audio signals and/or other audio data which can be used to transform audio signals. For example, the network output audio data may comprise a filter mask which may be used to filter the input audio signal and/or gain models to be applied to audio signals. For example, a neural network adapted for regression-based noise cancellation might directly output denoised audio signals. Additionally or alternatively, the network adapted for regression-based noise cancellation may output a filter mask with which the input audio signals may be filtered to remove noise.

Suitable neural networks for audio signal processing are known from the prior art. Suitable network architectures, in particular for regression-based acoustic processing, may be recurrent neural networks, convolutional neural networks and/or convolutional recurrent neural networks. Particularly suitable neural network architectures may be convolutional recurrent neural networks having a U-net structure. An exemplary neural network for noise cancelling is the CRUSE neural network described in “Towards efficient models for real-time deep noise suppression” by S. Braun et al. in ICASSP 2021, Jun. 2021, pp. 656 to 660 (in the following: S. Braun et al.). According to an aspect of the embodiments described herein, such networks might be enhanced to evaluate a confidence parameter and in particular to output the evaluated confidence parameter, as will be described in greater detail below.

The neural network may be executed on any device of the hearing system. For example, the neural network may be executed on the same device which performs the further audio signal processing, in particular on the processing unit for audio signal processing. The neural network can additionally or alternatively be executed by a different processing unit, in particular on a different device of the hearing system.

It is in particular possible, that the neural network is executed on a hearing device, in particular by the processing unit of the hearing device, and/or on a further device of the hearing system. For example, the neural network may be stored in a data storage of the computing unit of the hearing device and be executed by the computing device of the hearing device. Alternatively and/or additionally, the neural network may be stored and executed on a peripheral device of the hearing system. Running a neural network on a peripheral device has the advantage that the peripheral device is less restricted with regard to computational power and battery capacity than a hearing device, in particular a hearing aid. Different devices of the hearing system may comprise and execute different audio signal processing routines, in particular different neural networks for audio signal processing. It is also possible that a neural network for audio signal processing may be spread over several devices of a hearing system.

The confidence parameter resembles the reliability of the audio signal processing by the neural network. In other words, the confidence parameter is a measure of the performance of the audio signal processing by the neural network. For example, the confidence parameter may be an estimate of the accuracy of the neural network processing. For example, the confidence parameter may contain information to which degree the neural network has correctly solved its task. In particular, the confidence parameter may be an estimate how closely the instantaneous network output resembles a network output which would be achieved if the network performs its task correctly. For example, the confidence parameter may be a scalar value between 0 and 1 indicating low to high confidence in the reliability of the neural network processing. The confidence parameter may also be a vector, in particular if the reliability of several tasks of the network is individually estimated.

In general, the confidence parameter may be determined by the neural network itself or by a supplementary algorithm running in parallel to the neural network and/or monitoring the network output. For example, the supplementary algorithm may comprise a classification neural network being configured to solve a classification problem related to the regression problem at hand. Additionally or alternatively, the supplementary algorithm may comprise conventional routines for determining the confidence parameter. For example, a signal-to-noise-ratio estimate can be performed on a network output of the neural network.

In a classification neural network, the confidence parameter resembles how accurate the predicted classification parameter is. The classification parameter may be a natural by-product of the classification neural networks. For example, a neural network for solving classification problems may have N output neurons each output neuron resembling a possible class of sounds. The output neurons may be followed by a softmax activation for each of the neurons. The softmax activation transforms the outputs of the output neurons into probabilities for the respective class on a scale from 0 to 1. In classification problems, the output with the highest probability determines the predicted class. Based on the distribution of probabilities of all outputs, a confidence in the prediction can be derived. For example, a classification with two possible outcomes can have the probabilities 0.99 for a first outcome and 0.01 for the second outcome. In this case, there is a high certainty that the first class is correctly identified, thus resulting in a high confidence parameter (e.g. close to 1). If the two probabilities, however, are 0.51 and 0.49, the classification outcome is close to guessing. In consequence, the confidence parameter would be low (e.g. close to 0).

For example, in a regression-based neural network for noise cancellation, a high confidence parameter (e.g. a confidence parameter close to 1) may indicate that there is a high probability that the neural network has correctly removed noise from an audio signal and retained relevant sound information such as speech. On the other hand, if the confidence parameter is low (e.g. close to 0), there is a high risk that the neural network has not correctly performed its task, e.g. having produced artifacts by cancelling relevant sound information, in particular speech.

In case of a neural network performing regression-based acoustic processing, the network output audio data is not probabilistic, but resembles the network's best prediction for adequate audio data such as adequate filter masks and/or processed audio signals. In this case, the confidence parameter may be calculated externally from the neural network, e.g. by an additional classification neural network and/or by conventional routines, such as signal-to-noise estimation of the network output. Additionally or alternatively, the confidence parameter can be determined by the neural network itself. For this purpose, the neural network for regression-based acoustic processing may be enhanced to determine and in particular output the confidence parameter.

According to an illustrative aspect of the method, the confidence parameter determines whether and, in case, how the network output of the neural network is used in further processing steps of the audio signal processing or not. For example, in situations where the confidence parameter indicates a low reliability of the audio signal processing by the neural network, the network output of the neural network can be disregarded. This ensures that the network output is only used when the audio signal processing on the neural network can be relied on. In particular, artifacts produced by poor performance of the neural network processing do not influence the output audio signal.

Particularly in some examples, in instances in which the confidence parameter indicates a low reliability of the network output, the audio signal processing by the neural network can be replaced by more stable audio signal processing routines, in particular conventional audio signal processing routines, such as for example Wiener filter and/or beamforming. This allows to combine the high quality of neural network audio signal processing with the reliability of more stable, in particular conventional, audio signal processing routines. It is also possible to deactivate the audio signal processing by the neural network if the confidence parameter indicates a low reliability of the audio signal processing by the neural network. This reduces the computational load and energy consumption of the signal processing in situations where the neural network processing is not beneficial to the processing outcome.

According to an illustrative aspect of the method, the confidence parameter is determined by the neural network. While it is possible to determine the confidence parameter by other algorithms and routines, in particular by routines running in parallel to the neural network and/or monitoring the network output, the neural network itself may is better positioned to estimate its capabilities to perform its task for the given audio signal. Thus, the confidence parameter can be determined with a higher accuracy. This increases the accuracy and reliability of the method.

Particularly in some examples, the neural network outputs the determined confidence parameter. This allows to use the outputted confidence parameter for further steering of the signal processing on the hearing device. Moreover, outputting the confidence parameter renders the operation of the neural network more transparent. This allows to better monitor the audio signal processing by the neural network.

According to an illustrative aspect of the method, the neural network performs a classification task, in particular performs audio scene classification. Using a classification neural network, the confidence parameter may be determined in an easy and efficient manner. The result of the classification task, in particular of the audio scene classification, may be used to steer the further audio signal processing. Regularly, classification tasks are not particularly sensitive on processing latency, e.g. because the audio scene to be classified does not change that fast. Hence, the execution of a classification neural network may be performed on a first device, e.g. a peripheral device, and used for further steering further audio signal processing on second device, in particular on a hearing device, without increasing the latency of further audio signal processing.

According to an illustrative aspect of the method, the neural network performs regression-based acoustic processing to obtain network output audio data. The present embodiments are particularly advantageous for regression-based acoustic processing on neural networks. Such networks are particularly suited for a high quality audio signal processing, in particular noise cancellation, speech enhancement, dereverberation, signal separation, in particular sound source dependent signal separation, such as, for example, speaker extraction and/or speaker separation, and/or feedback cancellation. Since the network output audio data provides suitably processed audio signals and/or filter masks and/or gain models, such networks have a high impact on the quality of the output audio signal. On the other hand, artifacts and other processing errors may directly deteriorate the output audio signals, making the audio signal processing using regression-based acoustic processing particularly vulnerable to processing failures. Monitoring the function of the neural network by the confidence parameter particularly improves the reliability of the audio signal processing.

According to an illustrative aspect of the method, the neural network outputs the confidence parameter additionally to the network output audio data. The further signal processing can then be steered based on the outputted confidence parameter. For example, a higher-level algorithm may decide whether and how to use the network output audio data for determining the output audio signal. A further advantage of outputting the confidence parameter is that an additional algorithm monitoring the regression-based audio signal processing of the neural network is not required. Further, the confidence parameter has a high accuracy, reflecting the network's capability of processing the audio signal at hand.

While the network output of classification networks may be directly related to a confidence parameter, the network output audio data resulting from the regression-based acoustic processing cannot be directly related to a confidence parameter. For outputting the confidence parameter, the respective neural network can be configured, in particular trained, as will be described in greater detail below.

According to an illustrative aspect of the method, the regression-based acoustic processing by the neural network is modified in dependence of the confidence parameter. This expands the possibilities to react to situations in which the neural network processing has a low reliability. By modifying the regression-based acoustic processing on the neural network, the network processing can be adapted to the audio signal at hand, in particular to the hearing situation which a user of the hearing system encounters. For example, the network can tune its aggressiveness based on the confidence parameter. In situations of high reliability, the network can conduct an aggressive processing of the audio signals. For example, a network trained for noise cancellation can heavily suppress any signal components which it identifies as noise. In low confidence situations, high aggressiveness might lead to larger artifacts, in particular aggressive denoising might suppress relevant sound information, in particular speech. Thus, in low confidence situations, the network might switch to a less aggressive signal processing routine. For example, audio signal components which are considered to be noise can be less strongly suppressed, reducing the danger of suppressing relevant sound information.

For example, the regression-based acoustic processing can be modified by changing network tuning parameters provided to the neural network as additional network input. The confidence parameter may be mapped onto network tuning parameters. For example, based on the confidence parameter, different sets of network tuning parameters may be provided to the network. Suitable network tuning parameters may comprise feature vectors, network weights and/or other network parameters. For example, in a low confidence situation, the network weights of the network can be updated with network weights which have been obtained by training for less aggressive, but more stable audio signal processing.

An input to the neural network, which is used to steer the neural network based on the confidence parameter, will also be referred to as a confidence parameter input. The confidence parameter input may comprise the confidence parameter itself and/or network tuning parameters derived from the confidence parameter, e.g. by mapping the confidence parameter towards the network tuning parameter.

Additionally or alternatively, modifying the regression-based acoustic processing may be achieved internally of the neural network. For example, the neural network may be configured to adapt its processing based on the confidence parameter. The neural network may itself determine the confidence parameter and/or receive the confidence parameter as an additional input. In some examples, a confidence parameter input can be based on a confidence parameter previously determined and outputted by the neural network. This way, the confidence parameter can influence the regression-based acoustic processing of the neural network itself as well as further processing steps on the hearing device. This enhances the possibilities and flexibility to react to situations in which the reliability of the network processing is low.

According to an illustrative aspect of the method, the output audio signal comprises a mixture of a primary audio signal, which is obtained using audio signal processing by the neural network, and a secondary audio signal, which is obtained without using audio signal processing by the neural network, and wherein a mixing ratio of primary audio signal and secondary audio signal is determined based on the confidence parameter. The method is particularly flexible and reliable. The output audio signal can be efficiently adapted to the confidence level. The higher the confidence level, the more the neural network processing may contribute to the output signal, increasing the quality of the output signal. For lower confidence levels, the contribution of the neural network processing may be reduced, leading to a stable operation of the hearing system.

The primary audio signal is obtained using audio signal processing by the neural network. In some examples, the primary audio signal can be directly outputted by the neural network, in particular as a result of a regression-based acoustic processing by the neural network. Additionally or alternatively, the neural network may output a filter mask and/or a gain model which is used to filter and/or modulate the input audio signal. The primary audio signal may then be obtained by filtering and/or modulating of the audio input signal based on the network output. It is also possible that the contribution of the neural network processing lies in classification and/or target localization tasks.

The secondary audio signal is obtained without using audio signal processing by the neural network. Thus, the secondary audio signal is not influenced by the neural network processing. The secondary audio signal may comprise the input audio signal, in particular the unprocessed input audio signal and/or the input audio signal being processed by alternative audio processing routines. For example, the secondary audio signal may comprise the input audio signal which has been processed by conventional audio processing routines. In case of a neural network for classification tasks, the secondary audio signal may for example be obtained upon the classification by a standard classifier.

The secondary processing routine may be adapted to perform the same kind of audio signal processing as the neural network. The secondary processing routine may result in less performant but more stable audio signal processing than the neural network. For example, the secondary processing routine may comprise a secondary neural network which employs less aggressive processing of the input signal. Alternatively or additionally, the secondary processing routine may comprise a conventional processing routine. For example, the secondary processing routine may comprise exclusively conventional processing routines. Exemplary conventional processing routines are beamformer, Wiener filter and/or standard classifiers. Having a higher stability, the secondary processing routines ensure functionality of the hearing system even in low confidence situations. The secondary processing routine may also be referred to as a fallback processing routine.

The neural network and the secondary processing routine may be comprised and executed on the same device of the hearing system, in particular on a hearing device of a hearing device system. It is also possible that the neural network and the secondary processing routine are comprised and executed on different devices of the hearing system. This is particularly suitable in cases where the secondary processing routine and the neural network are executed in parallel. This allows to spread the computational tasks on several devices. For example, the neural network may be executed on one hearing device and the secondary processing routine on another hearing device of a hearing device system. It is also possible that the hearing device executes the secondary processing routine, having lower computational needs. The neural network may then be executed by a peripheral device of the hearing device system, e.g. by a smartphone.

Particularly in some examples, the sensitivity of the mixing of the primary audio signal and the secondary audio signal can be controlled. For example, a temporal smoothing filter can be used to control the sensitivity of the mixing. This way, harsh changes in the output audio signal, which might irritate the user, are reduced, in particular avoided. The hearing experience is improved.

According to an illustrative aspect of the method, the input audio signal is processed by a secondary processing routine to obtain a secondary audio signal. This ensures processing, in particular enhancing, of the input audio signal also in low confidence situations. The overall hearing experience is improved.

The secondary processing routine may be executed in parallel or alternately to the neural network. For example, parallel execution of the secondary processing routine allows for a mixing of the secondary audio signal and the primary audio signal to obtain the output audio signal. This allows for gradual changes in the output signal depending on the confidence parameter. Harsh changes in the output audio signal are avoided. The alternate processing of the secondary processing routine is particularly efficient. In low confidence situations, the neural network processing may be stopped and the secondary processing routine may take over. The neural network processing may be restarted when the confidence parameter increases above a certain threshold. For example, it is possible that the neural network processing is only used in situations where the confidence level is high and the audio signal processing can particularly benefit from the advantages of the neural network. This way, the energy and processing needs of the audio signal processing may be further reduced. It is also possible that the secondary processing routine takes over the audio signal processing in order to save energy. This is particularly advantageous if the state of charge of the respective device of the hearing system, in particular of the hearing device, is low.

According to an illustrative aspect of the method, an audio signal to be processed by the neural network is based on a transformation of the input audio signal received over a time interval, wherein a length of the time interval depends on the confidence parameter. This allows particularly efficient and easy steering of the audio signal processing based on the confidence parameter. In some examples, the length of the time interval and the confidence parameter anticorrelate. In other words, the lower the confidence parameter, the longer the lengths of the time interval may be chosen. The shorter the time interval is, the lower the latency of the transformation and the further audio signal processing becomes. However, choosing smaller time intervals leads to less information contained in the transformed audio signal. In complex hearing situations, this might lead to low reliability of the audio signal processing by the neural network. In this case, the time interval, on which the transformation is performed, may be increased. This increases the stability of the neural network processing. For example, it may be possible to switch between two different lengths of the time interval depending on the confidence parameter.

The transformation of the input audio signal may comprise calculation of a frequency spectrum, a cepstrum and/or cepstral coefficients of the input audio signal received over the time interval. Frequency spectrums, cepstrums and/or cepstral coefficients are particularly suitable network inputs for audio signal processing by a neural network. The input audio signal may be recorded over a certain time interval and transformed into a frequency spectrum, e.g. by Fourier transformation, in particular by Fast Fourier Transformation.

According to an illustrative aspect of the method, a sample of the input audio signal is recorded in situations where the confidence parameter indicates a low reliability of the audio signal processing by the neural network. This allows to document situations of poor performance of the neural network. In some examples, the recordings may be used for future improvements of the neural network processing. In some examples, a sample of the input audio signal is recorded for future training of the neural network. This allows a target-orientated improvement of the neural network. In particular, hearing situations in which the neural network struggles can be specifically trained.

For example, the recorded sample may be transferred to a peripheral device of the hearing system and/or an external device, e.g. to a remote server. On an external device, in particular on a remote server, samples of different hearing systems of a plurality of users may be collected. This way, a particularly effective training and improvement of the neural networks may be achieved. The neural network may in particular be trained on the peripheral device and/or the external device. Updated network parameter, in particular network weights, can then be implemented on the hearing system.

Different examples and possibilities of steering the audio signal processing based on the confidence parameter have been described above. It is clear for the person skilled in the art that the above-discussed options may be combined. For example, it is possible to determine, based on the confidence parameter, whether and how a network output of the neural network is used. In particular, the confidence parameter may govern a mixing ratio between a primary audio signal and a secondary audio signal. Additionally, the confidence parameter may be used as a confidence parameter input to the neural network to modify an audio signal processing by the neural network, in particular to modify regression-based acoustic processing by the neural network.

It is a further feature of the present embodiments described herein to improve a hearing system, in particular to provide a hearing system which is reliable and consistent in audio signal processing.

This feature is achieved by the hearing system as claimed in claim 12. The hearing system comprises an audio input unit for receiving an input audio signal, a processing unit for audio signal processing the input audio signal into an output audio signal and an audio output unit for outputting the output audio signal. The hearing system further comprises a neural network for audio signal processing which, when executed, contributes to the audio signal processing on the hearing device. The hearing system is configured to determine a confidence parameter resembling the reliability of the audio signal processing by the neural network and to steer the audio signal processing by the neural network and/or further steps of the audio signal processing on the processing unit based on the confidence parameter. The hearing system combines the high performant audio signal processing by a neural network with an overall improved stability of the audio signal processing. The further advantages and features of the hearing system may correspond to those described above with respect to the method for audio signal processing on a hearing system.

The neural network of the hearing system may be configured for classification tasks or for regression-based acoustic processing.

According to an illustrative aspect of the hearing system, the neural network is configured for regression-based acoustic processing to obtain network output audio data. A hearing system with such a neural network particularly benefits from the determination of the confidence parameter and the steering based thereon.

According to an illustrative aspect, the hearing system further comprises a mixing unit for mixing a primary audio signal, which is obtained using audio signal processing by the neural network, with a secondary audio signal, which is obtained using audio signal processing by the neural network. Mixing the primary audio signal and the secondary audio signal allows to gradually change the influence of the neural network on the output audio signal. Particularly in some examples, the mixing ratio is dependent on the confidence parameter. In low confidence situations, the contribution of the primary audio signal may be decreased in favor of the secondary audio signal. For particularly low confidence parameters, the primary audio signal may be completely disregarded, resulting a vanishing contribution of the primary audio signal in the mixture. In contrast, the primary audio signal contribution to the mixture may be increased for higher confidence parameters. For particularly high confidence parameters (e.g. close to 1), the secondary audio signal may be completely disregarded.

A mixing ratio may be determined by a mapping of the confidence parameter towards a mixing ratio. For example, the hearing system may comprise a mapping unit for mapping the confidence parameter onto the mixing ratio. The mapping unit may further be configured to map the confidence parameter to a network tuning parameter. The network tuning parameter can be fed back to the neural network as part of a confidence parameter input to steer the network processing based on the confidence parameter, in particular to steer the regression-based acoustic processing by the neural network based on the confidence parameter. The hearing system may comprise a mapping unit for mapping the confidence parameter, in particular the confidence parameter outputted by the neural network, onto a mixing ratio and/or a network tuning parameter, in particular a confidence parameter input which is fed back into the neural network.

The hearing system may further comprise a secondary processing routine for obtaining the secondary audio signal. The secondary processing routine may be comprised and/or executed on the same device as the neural network, in particular on the hearing device. Alternatively, the secondary processing routine and the neural network may be comprised and/or executed on different devices.

The hearing system optionally comprises an audio signal conditioning unit. The audio signal conditioning unit may condition the input audio signal for further processing by the neural network and/or a secondary processing routine. For example, a conditioning unit may extract features from the audio signal which are used as an input to the neural network and/or the secondary processing routine. For example, the conditioning unit may calculate a spectrum, in particular a frequency spectrum, of the input audio signal, e.g. by applying a Fast Fourier Transformation. The conditioning unit may provide a cepstrum of the input audio signal. The conditioning unit may additionally or alternatively compress the input audio signals and/or change the data format of the input audio signals. In some examples, the hearing system comprises the conditioning unit. For example, the conditioning unit may be a part of the audio input unit.

The hearing system may further comprise an audio signal composing unit for composing an audio signal based on a network audio data output and/or an output of a secondary processing routine. For example, the audio signal composing unit may apply a filter mask provided by the neural network to the input audio signal to filter the input audio signal. Additionally or alternatively, the audio signal composing unit may modulate the input audio signal based on a gain model outputted by the neural network. For example, the hearing may comprise the audio signal composing unit. The audio signal composing unit may for example be part of a mixing unit and/or an audio output unit.

According to an illustrative aspect, the hearing system comprises one or more hearing devices, in particular one or more hearing aids, e.g. a cochlear implant and/or a bone-anchored hearing aid. Hearing devices, in particular hearing aids, particularly profit from the improved audios signal processing by the neural network. In particular, one or more of the above-discussed components of the hearing system may be realized on the one or more hearing devices. For example, the audio input unit and/or the audio output unit may be realized on the at least one hearing device. Receiving the input audio signal, in particular by recording ambient sound, on the hearing device has the advantage that the audio input signal, in particular the recorded sound, resembles the ambient sound which reaches the ear of the user. Effects like head shadowing or head movement may be considered in the audio signal processing. Realizing the audio output unit on the at least one hearing device has the advantage that the output audio signal may be directly played back to the user. Additionally or alternatively, the processing unit and/or the neural network may be realized on the at least one hearing device. Audio processing on the hearing device advantageously reduces processing latency.

It is a further aspect of the embodiments described herein to provide an improved neural network for audio signal processing, in particular a neural network which is particularly suitable for audio signal processing on a hearing system.

This feature is achieved by a neural network with the features claimed in claim 15. The neural network is configured to perform regression-based acoustic processing of an audio signal to obtain network output audio data. The neural network is further configured to determine a confidence parameter resembling the reliability of the regression-based acoustic processing and to output the confidence parameter and/or to modify the regression-based acoustic processing in dependence of the confidence parameter. Regression-based acoustic processing by neural networks is particularly advantageous for audio signal processing. In particular, the network output audio data may comprise correspondingly processed audio signals and/or filter masks and/or gain models. The network output audio data may be used in the audio signal processing on a hearing system, in particular on a hearing device of a hearing system, to obtain high-quality output audio signals. The confidence parameter determination further increases the reliability of the neural network processing, reducing the impact of erroneous processing by the neural network, in particular of processing artifacts which may disturb the user experience.

Particularly in some examples, the neural network comprises a further output for the confidence parameter. The confidence parameter may be outputted additionally to the network output audio data. This allows the steering of the further audio signal processing based on the confidence parameter established by the neural network.

The regression-based acoustic processing may in particular be used for noise cancellation, feedback cancellation, dereverberation, signal separation, in particular sound source dependent signal separation, such as, for example, speaker extraction and/or speaker separation, and/or speech enhancement. Neural networks performing suitable regression-based acoustic processing tasks are known from the prior art. The neural network may be based on known networks for regression-based acoustic processing upon enhancement of the network structure and/or further training of the neural network.

The neural network may, for example, comprise an input interface for receiving an audio signal as input, one or more layers for the regression-based acoustic processing of the inputted audio signal into the network output audio data and an output interface for outputting the network output audio data. The input interface and/or the output interface may be configured as an input layer and an output layer. The one or more layers for the regression-based acoustic processing may be hidden layers. For example, the network may comprise fully connected layers and/or gated recurrent unit layers. Suitable neural networks are in particular recurrent neural networks and convolutional neural networks. Particularly suitable neural network architectures are described in section 3 of S. Braun et al., e.g. the CRUSE network shown in FIG. 2 of that article.

According to an illustrative aspect of the embodiments described herein, the neural network is configured to further receive a confidence parameter input. Via the confidence parameter input, a controlled steering of the neural network processing can be achieved. The confidence parameter input may comprise the confidence parameter outputted by the neural network. Particularly in some examples, a confidence parameter outputted by the neural network may be fed back into the neural network as confidence parameter input. The confidence parameter input may comprise network tuning parameter obtained based on the confidence parameter. For example, the confidence parameter outputted by the neural network may be mapped towards the network tuning parameter.

In the following, possible configurations of a neural network are described. The neural network can be based on the architecture and training of neural networks for regression-based acoustic processing known from the prior art. For example, the neural network may have a corresponding network architecture. It is not necessary to change the network architecture of known regression neural networks.

In case the confidence parameter determined by the neural network should be outputted, one or more additional outputs may be added to the output interface, in particular one or more additional output neurons may be added to the output layer. The number of additional outputs may depend on the dimension of the confidence parameter. For example, a scalar confidence parameter may be outputted using an additional output. In some examples, the one or more output neurons for outputting the confidence parameter may be followed by an activation function for transforming the output into a suitable format, in particular in form of a probability. An exemplary activation function may be the softmax function. Additionally or alternatively, an additional input may be added to an input interface, in particular to an input layer, for allowing for a confidence parameter input. Additionally or alternatively, the number of neurons per layer, in particular per hidden layer, may be increased to account for the additional calculation effort for determining the confidence parameter.

It is also possible to supplement the network architecture of known regression neural networks by additional structures and/or modules. For example, the neural network may comprise a regression module for the regression-based audio processing and a confidence module for determining the confidence parameter. The regression module may correspond to the architecture of known networks for regression-based acoustic processing. The confidence module may provide a dedicated path for estimating the confidence parameter. The confidence module may comprise one or more hidden layers. The confidence module and the regression module, in particular one or more layers of the respective modules, may be connected to exchange network parameters, e.g. internal states and/or features.

Training of the neural network may be based on training of known networks for regression-based acoustic processing. In particular, known training strategies, in particular known strategies for training data generation, may be applied to train the neural network for regression-based acoustic processing. For example, regression-based acoustic processing for noise cancellation can be performed by combining noise-free audio samples, in particular clean speech, with noise. For example, speech and noise pairs from corresponding data bases are randomly combined with a random signal-to-noise ratio. A suitable training strategy for such regression-based noise cancellation is described in S. Braun et al., in particular in section 4 and FIG. 4.

Additional training may be required regarding the estimation of the confidence parameter and, optionally, the confidence parameter output. For example, the regression neural network may be further trained using an additional training data set comprising audio samples and for each audio sample an audio sample label as well as a confidence parameter label. The audio samples as well as the corresponding audio sample labels may be selected, in particular generated, in the same way as known training data sets for training of regression-based acoustic processing. For example, the audio sample may be a combination of a clean signal and a noise, whereas the audio sample label comprises the clean signal. The audio sample labels resemble the target-result of the regression-based acoustic processing. The audio sample labels may also be referred to as regression labels. Further, suitable training labels for the confidence parameter may be provided. For example, suitable confidence parameter labels may be obtained by running regression-based acoustic processing on a pre-configured neural network.

For example a suitable neural network being pre-configured, in particular pre-trained, for regression-based acoustic processing may be provided. It is also possible to pre-configure, in particular pre-train, the neural network for regression-based acoustic processing. Pre-training the neural network may utilize known training schemes, in particular known training data sets. During pre-training, a possible confidence parameter output and/or a possible confidence parameter input may be disregarded. Further, it is possible to only train a regression module of the neural network. Further parts of the neural network, e.g. a confidence parameter input and/or a confidence parameter output and/or a confidence module may be added to the pre-configured neural network.

Starting from the pre-configured neural network, the confidence parameter labels may be determined by one of the following strategies:

For determining the confidence parameter labels, the pre-trained neural network may be run in inference mode, solving the regression-based acoustic processing for the audio samples of the second training set. The result of the network calculation can be manually evaluated. For example, the processed audio signal can be presented to listeners who rate the results according to the perceived quality with respect to the corresponding network task, e.g. noise cancellation, feedback cancellation, dereverberation, signal separation, in particular sound source dependent signal separation, such as, for example, speaker extraction and/or speaker separation, and/or speech enhancement. The user rating may then be translated into a confidence parameter label for the respective audio sample.

It is also possible to execute the regression-based audio processing by the neural network for each audio sample multiple times, wherein in each run, the audio sample is combined with a random perturbation. For example, one or more of the following perturbations may be added to the audio samples: noise, in particular pink noise, speech-shaped noise, time shifts to the input spectra along the timeframe dimension, reverberation and/or non-perceivable phase-shifts. After several runs for each audio sample with different perturbations, the stability of the network processing may be estimated by assessing the variation of the network output audio data. For example, assessment of the variations may comprise evaluating suitable loss-functions, short-time objective intelligibility (STOI), perceptual evaluation of speech quality (PESQ) and/or signal-to-noise-ratios (SNR). The confidence parameter may then for example be related to a standard deviation of the network output audio data. In particular, the standard deviation may be mapped towards the confidence parameter. For example, if the standard deviation exceeds a certain threshold, the confidence label can be set accordingly. Some perturbations, in particular time shifts, may also have to be imposed on the labels if calculations need an alignment between in- and output.

The calculation results of perturbed audio sample inputs may also be presented to listeners for manual evaluation. The listeners can then evaluate each perturbed audio sample individually and a confidence parameter can be calculated based on the individual ratings for each audio sample.

The neural network may be further trained based on the second training data set containing the determined confidence parameter labels.

Additionally or alternatively, the second training data set, in particular the determined confidence parameter labels, may be used for training a confidence classification neural network to estimate confidence parameter labels. Once trained, the confidence classification neural network may be used to generate confidence parameter labels for further training data sets. The confidence classification neural network may correspond to known classification neural networks, e.g. a binary classifier. The confidence classification neural network may have known network architectures for classification tasks, in particular comprising connected layers, convolutional layers and/or recurrent layers. Since the confidence classification neural network is only used during training, the confidence classification neural network is less constrained with regard to computational complexity and memory restrictions because the confidence classification neural network does not have to be run on a device of the hearing system, in particular on a hearing device or a peripheral device of the hearing system. An exemplary input to the confidence classification neural network may comprise predictions obtained by regression-based acoustic processing by the neural network, derived features and/or training labels, in particular regression labels. Inputs not including regression labels allow for a non-intrusive operation of the confidence classification neural network. Inputs including regression labels allow for an intrusive operation of the confidence classification neural network.

The pre-trained neural network may be further trained using suitable training data sets comprising confidence parameter labels, in particular confidence parameter labels obtained by running the pre-trained neural network in inference mode and/or by a confidence classification neural network. For example, the obtained confidence parameter labels may be presented directly to the network as labels for a confidence parameter output. Additionally or alternatively, it is possible to include the confidence parameter labels in the loss function for training of the regression-based acoustic processing. A suitable loss function may comprise two components, one being associated with the regression-based acoustic processing and the other with the confidence parameter label. This way, a simultaneous training of the regression-based acoustic processing and the confidence parameter estimation can be achieved.

In some examples, the neural network may be trained to consider the confidence parameter in the regression-based acoustic processing, in particular to modify the regression-based acoustic processing based on the confidence parameter. For example, audio signal labels may be made dependent on the confidence parameter label. For example, the audio signal label may reflect a more or less aggressive processing of the audio signal based on the audio sample confidence parameter label. This way, the network is trained to intrinsically steer the aggressiveness of the regression-based acoustic processing.

It is further possible to add a confidence parameter input. During training, the confidence parameter input may be based on the confidence parameter labels. In inference mode, the confidence parameter input may be based on a confidence parameter outputted by the neural network.

The neural network may be trained using a confidence parameter output, explicitly using regression labels and confidence parameter labels. Doing so, it is in particular possible to train the network to intrinsically consider the confidence parameter and to modulate the regression-based acoustic processing based on the confidence parameter. Using the neural network in inference mode, the confidence parameter output may be used to steer further processing. It is also possible that the confidence parameter output is disregarded in inference mode. In any case, the confidence parameter output may be used as a regularizer during training to more explicitly impose the sensitivity to the confidence parameter.

FIG. 1 schematically depicts a hearing system 1 comprising a hearing device 2 in the form of hearing aid. The hearing device 2 may for example be a chochlear implant or a bone-anchored hearing device. The exemplarily shown hearing system 1 is a hearing device system. The hearing device 2 may be the only device at the hearing system 1. The hearing system 1 may also comprise further devices, e.g. a further hearing aid. Exemplary hearing device systems may comprise two hearing aids being configured to be worn in the left and right ear of a hearing device system user, respectively. The hearing device system may further comprise peripheral devices, e.g. a smartphone being connectable to the hearing device 2 in a data-transmitting manner. In other embodiments, the hearing system may comprise or be realized by devices other than hearing devices. For example, the hearing system may comprise one or more loudspeakers, e.g. a soundbar, headphones, earphones, headsets, hearing protection devices and/or a TV connector.

The hearing device 2 comprises an audio input unit 3 for receiving an input audio signal I. The audio input unit 3 is an electro-acoustic transducer in the form of a microphone. The audio input unit 3 records ambient sound S and produces an electrical signal carrying information about the ambient sound S in the form of the input audio signal I.

The hearing device 2 comprises a processing unit 4 for audio signal processing the input audio signal I into an output audio signal O. The processing unit 4 comprises one or more audio signal processing routines which may be stored on a data storage and, for audio signal processing, may be executed on a processing device of the processing unit 4. The data storage and processing device of the processing unit 4 are not explicitly shown. FIG. 1 illustrates the audio signal processing of the input signal I into the output signal O schematically by showing audio signal processing routines and other units contributing to the audio signal processing as dashed boxes. Audio signals and other data, in particular audio data, which are exchanged between the different processing routines and units, are depicted as arrows with straight lines.

The hearing device 2 comprises an audio output unit 5 for outputting the output audio signal O. The audio output unit 5 is an electro-acoustic transducer in the form of a receiver. The audio output unit 5 transforms the output audio signal O into processed sound S' which is played back to a user of the hearing system 1.

In the following, the audio signal processing on the hearing device 2 is described. The input audio signal I is received by the audio input unit 3. The received input audio signal I is passed to the processing unit 4.

The processing unit 4 comprises a neural network 6. The neural network 6 is configured for regression-based acoustic processing of the input audio signal I. In the shown embodiment, the neural network 6 is configured for speech enhancement on the input audio signal I. The neural network 6 receives the input audio signal I as an input. After regression-based acoustic processing of the input audio signal I, the neural network 6 returns a primary audio signal A1. The primary audio signal A1 is the neural network's 6 prediction for a speech enhanced input audio signal.

The neural network 6 is further configured to determine a confidence parameter C. The confidence parameter C is outputted by the neural network 6 as an additional output. The confidence parameter C is a scalar value resembling the neural network's 6 estimate of the reliability of the regression-based acoustic processing by the neural network 6. In other words, the confidence parameter C reflects the neural network's 6 confidence in its own capabilities to correctly process the input audio signal I. The confidence parameter C thus also is a measure of the quality of the primary audio signal A1, in particular in how far the primary audio signal A1 may be used in the further audio signal processing. The confidence parameter C is used to steer the audio signal processing on the hearing device 2.

The processing unit 4 comprises a secondary processing routine 7. The secondary processing routine 7 provides an alternative, less complex speech enhancement algorithm. The secondary processing routine 7 comprises a conventional speech enhancement algorithm, for instance using beamforming or a Wiener filter. The secondary processing routine 7 provides a lower performant speech enhancement, but is more stable in situations where the neural network 6 may perform erratically.

The secondary processing routine 7 is executed by the processing unit 4 in parallel to the neural network 6. For this purpose, the input audio signal I is used as an input to the secondary processing routine 7. For example, the input audio signal I may be duplicated by the processing unit 4 to be used as an input in the neural network 6 as well as in the secondary processing routine 7. The secondary processing routine 7 performs speech enhancement on the input audio signal I. The secondary processing routine 7 outputs a secondary audio signal A2.

The processing unit 4 comprises a mixing unit 8. The mixing unit 8 receives the primary audio signal A1 and the secondary audio signal A2 as input. The mixing unit 8 combines the primary audio signal A1 and the secondary audio signal A2 to form the output audio signal O. The output audio signal O is a mixture of the primary audio signal A1 and the secondary audio signal A2.

The confidence parameter C is used to steer the audio signal processing. In the shown embodiment, the confidence parameter C determines a mixing ratio of the primary audio signal A1 and the secondary audio signal A2. The confidence parameter C is fed as an input into a mapping unit 9. The mapping unit 9 maps the confidence parameter C towards a mixing ratio. The mapping unit 9 provides a corresponding mixing ratio parameter M to the mixing unit 8. The mixing unit 8 mixes the primary audio signal A1 and the secondary audio signal A2 in accordance with the mixing ratio parameter M.

In cases where the confidence parameter C indicates a high reliability of the regression-based acoustic processing on the neural network 6, there is a high probability that the neural network 6 performs well, in particular the regression-based acoustic processing does not lead to artifacts in the primary audio signal A1. In situations where the confidence parameter C indicates a low reliability, there is an increased risk that the neural network is not performing well, in particular produces artifacts. Such artifacts can negatively impact intelligibility or may exhibit distracting behavior of the primary audio signal A1 such as dropping words randomly. By mapping the confidence parameter C towards the mixing ratio, the reliability of the regression-based acoustic processing is taken into account in the composition of the output audio signal O. In low confidence situations, the contribution of the primary audio signal A1 may be reduced in favor of the secondary audio signal A2 in the output audio signal. For particularly low confidence levels, the primary audio signal A1 may even be completely disregarded. In contrast, in situations of high confidence, the contribution of the secondary audio signal A2 to the output audio signal O may be decreased. This allows to benefit from the superior audio processing on the neural network 6 and respective higher quality of the primary audio signal A1 in situations where the neural network performs well. In situations of high confidence, it is also possible to disregard the secondary audio signal A2 completely. In such cases, the output audio signal O may be composed only of the primary audio signal A1. Steering the signal processing using the confidence parameter C thus combines the superior processing by the neural network 6 with the reliability of the secondary processing routine 7.

A temporal smoothing filter may be applied to control sensitivity of the mixing of the primary audio signal A1 and the secondary audio signal A2.

The mapping unit 9 maps the confidence parameter C towards a confidence parameter input T. The confidence parameter input T is provided as an input to the neural network 6. Via the confidence parameter input T, information based on the confidence parameter C is fed back into the neural network 6. Using the confidence parameter input, the regression-based acoustic processing of the input audio signal I can be tuned in dependence of the confidence parameter C. For example, the aggressiveness of the audio signal processing on the neural network may be adapted to the confidence parameter C. A less aggressive signal processing is less prone to produce artifacts. In contrast, in situations of high confidence, more aggressive signal processing may be applied, which leads to a stronger speech enhancement by the neural network. The confidence parameter input T thus provides a further possibility to steer the processing in dependence of the confidence parameter.

The confidence parameter input T may comprise the confidence parameter C, in particular may correspond to the confidence parameter C. For example, the neural network 6 may be configured to intrinsically take into account the confidence parameter C when performing the regression-based acoustic processing. Additionally or alternatively, the mapping unit 9 map the confidence parameter C towards network tuning parameters. Exemplary network tuning parameters may comprise updated network weights and/or feature vectors, which steer the neural network processing in dependence of the confidence parameter C. For example, different sets of network weights may be available for different confidence levels. The respective network weights may be inputted to the neural network 6 in order to modify the neural network processing.

Additionally or alternatively, also the input audio signal, which is inputted to the neural network 6, may be modified on the basis of the confidence parameter C. For example, the input audio signal I may be conditioned before being further processed by the neural network 6. For example, conditioning of the input audio signal I may comprise transforming, in particular Fourier transforming recorded sounds. For this purpose, the ambient sounds S are recorded over a time interval and the recorded sounds are Fourier transformed, e.g. by a Fast Fourier Transformation. In high confidence situations, the time interval may be reduced, which decreases the latency of the audio signal processing. In low confidence situations, the time interval may be increased, leading to more stable signal processing.

In the shown embodiment, the neural network 6 is trained for speech enhancement. In other embodiments, the neural network can perform other regression-based acoustic processing tasks, for example noise cancellation, dereverberation, signal separation, in particular sound source dependent signal separation, such as, for example, speaker extraction and/or speaker separation, and/or feedback cancellation. The secondary processing routine 7 may then be configured respectively to perform noise cancellation and/or feedback cancellation. While in the shown embodiment, the neural network 6 outputs audio signals, which may be directly used in the output audio signal O, neural networks according to other embodiments may output filter masks and/or gain models. Based on the filter masks and/or gain models, the input audio signal I can be transformed into a primary audio signal A1 and/or the output audio signal O.

In yet another embodiment, the neural network 6 performs a classification task. For example, a network output may classify the audio scene. Based on the network output, other signal processing routines on the hearing device 2 may be steered, e.g. by choosing appropriate filter masks. The secondary processing routine 7 may be a standard classifier. The secondary processing routine 7 may take over the classification task in situations where the confidence parameter C indicates a low reliability of the classification neural network.

In yet another embodiment, the neural network may be trained for a target localization task. The further audio signal processing on the hearing device may be steered based on the corresponding network output.

In the shown embodiment, the neural network 6 is comprised by and executed by the hearing device 2. In other embodiments, the neural network 6 may be comprised by and executed by other devices of the hearing system 1, e.g. by a smartphone. For this purpose, the hearing device 2 may be in data connection, in particular in wireless data connection, with other devices of the hearing system 1. For example, the input audio signal I may be transferred from the hearing device 2 to a peripheral device of the hearing system 1. The neural network 6 may be executed on the peripheral device. Further audio signal processing may then be executed on the hearing device 2 considering processing results obtained by executing the neural network 6 on the peripheral device. It is also possible that the peripheral device performs the entire audio signal processing. The resulting output audio signal may be streamed to the hearing device 2 for being played back to the user.

In the shown embodiment, the hearing device 2 further comprises the secondary processing routine 7. In other embodiments, the further processing routine may be implemented on another device of the hearing system 1. For example, a hearing system may comprise two or more device, e.g. two hearing devices. One device, in particular a first hearing device, may comprise and execute a neural network. Another device, in particular a second hearing device, may comprise and execute the secondary processing routine.

Additionally or alternatively, the hearing device 2 may record a sample of the input audio signal I in cases of low confidence. The recorded sound sample may be used for further training of the neural network 6. The neural network 6 can be specifically trained using such sound samples to improve its performance in situations where the confidence parameter indicates unstable operation.

In other embodiments, the secondary audio signal A2 may also comprise the unprocessed input audio signal I. For example, unprocessed input audio signal I may bypass the secondary processing routine 7 and be used as an input to the mixing unit 8. It is also possible to switch off the secondary processing routine 7 to provide unprocessed input audio signals I to the mixing unit 8. The output audio signal O may then comprise a mixture of the primary audio signal A1 and unprocessed input audio signals I, wherein the mixing ratio is determined by the confidence parameter C.

It is particularly advantageous when the neural network is configured for a regression-based acoustic processing and additionally to determine the confidence parameter. The determined confidence parameter can be outputted and/or used to modify the regression-based acoustic processing by the neural network. Upon suitable training, such a neural network can be implemented on known network structures.

Figure 2:
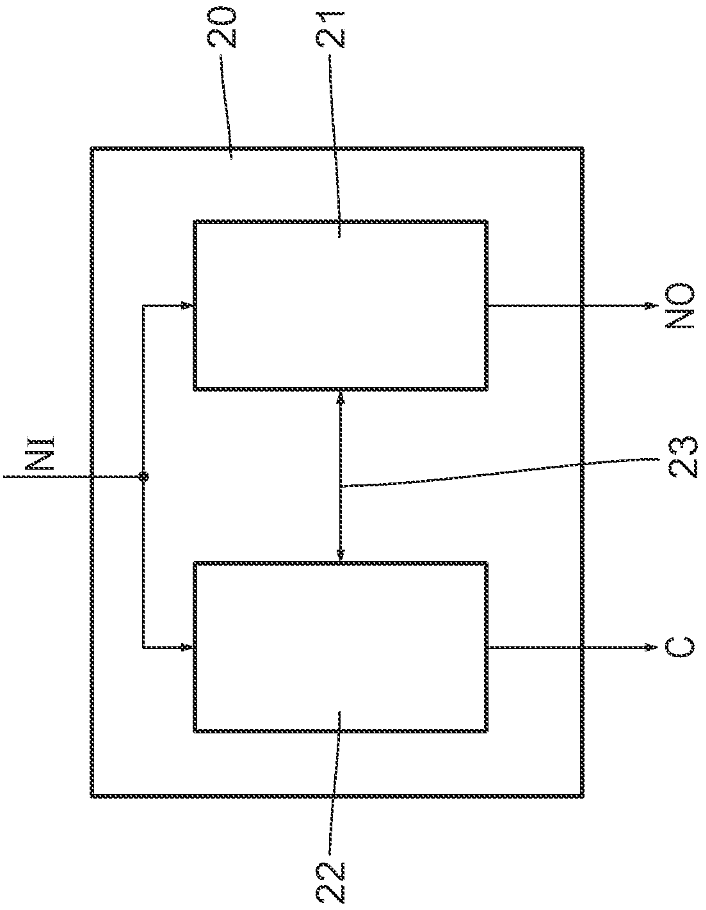
FIG. 2 shows a schematic depiction of an exemplary network structure of a neural network for regression-based acoustic processing having an additional output for a confidence parameter.

It is also possible to enhance the neural network structure. For example, the number of neurons for one or more layers may be increased. Additionally or alternatively, it is also possible to provide an additional confidence module. The confidence module may provide a dedicated path for the determination of the confidence parameter. FIG. 2 shows an example of a neural network 20 having an enhanced network structure. The neural network 6, which has been described with reference to FIG. 1, may have the structure of the neural network 20.

The neural network 20 comprises a regression module 21 and a confidence module 22. The neural network 20 receives a network input NI as input. The network input NI comprises input audio data I. The network input NI may further comprise a confidence parameter input. The neural network 20 outputs network output audio data NO. Network output audio data NO is obtained by processing the input audio data I by the regression module 21. The regression module 21 may coincide with neural networks for regression-based acoustic processing known from the prior art. The network output audio data NO may contain any suitable audio data, e.g. filter masks, gain models and/or audio signals, in particular a primary audio signal.

The neural network 20 comprises a further output for outputting the confidence parameter C. The confidence parameter C is determined by the confidence module 22. The confidence module 22 provides a dedicated path for the determination of the confidence parameter C. The confidence module 22 may comprise one or more layers.

The confidence module 22 is connected to the regression module 21. The connection of the confidence module 22 and the regression module 21 is exemplarily shown by a connection link 23. Via the connection link 23, features and internal states of the confidence module 22 and the regression module 21 can be exchanged. It is possible that the confidence module 22 and the regression module 21 are connected by several connection links. For example, one or more layers of the respective modules may be connected by respective connection links. For example, features and/or internal states may be exchanged between layers of the respective modules.

What is claimed is:

1. A method for audio signal processing on a hearing system, the hearing system having an audio input unit, a processing unit for audio signal processing, an audio output unit, and a neural network for audio signal processing, the method comprising:

receiving an input audio signal by means of the audio input unit, audio signal processing the input audio signal into an output audio signal at least partially by means of the processing unit, the audio signal processing including executing audio signal processing by the neural network for performing a step of the audio signal processing, determining a confidence parameter resembling a reliability of the audio signal processing by the neural network, and steering the audio signal processing in dependence of the confidence parameter, outputting the output audio signal by means of the audio output unit.

2. The method according to claim 1, wherein the confidence parameter determines whether a network output of the neural network is used in further processing steps of the audio signal processing.

3. The method according to any claim 1, wherein the confidence parameter is determined by the neural network.

4. The method according to claim 1, wherein the neural network performs a classification task, in particular performs audio scene classification.

5. The method according to claim 1, wherein the neural network performs regression-based acoustic processing to obtain network output audio data.

6. The method according to claim 5, wherein the neural network outputs the confidence parameter additionally to the network output audio data.

7. The method according to claim 5, wherein the regression-based acoustic processing by the neural network is modified in dependence of the confidence parameter.

8. The method according to claim 1, wherein the output audio signal comprises a mixture of a primary audio signal, which is obtained using audio signal processing by the neural network, and a secondary audio signal, which is obtained without using audio signal processing by the neural network, and wherein a mixing ratio of primary audio signal and secondary audio signal is determined based on the confidence parameter.

9. The method according to claim 1, wherein the input audio signal is processed by a secondary processing routine to obtain a secondary audio signal.

10. The method according to claim 1, wherein an audio signal to be processed by the neural network is based on a transformation of the input audio signal received over a time interval, wherein a length of the time interval depends on the confidence parameter.

11. The method according to claim 1, wherein a sample of the input audio signal is recorded in situations, when the confidence parameter indicates a low reliability of the audio signal processing by the neural network.

12. A hearing system, comprising:

an audio input unit for receiving an input audio signal, a processing unit for audio signal processing the input audio signal into an output audio signal, an audio output unit for outputting the output audio signal, and a neural network for audio signal processing which, when executed, contributes to the audio signal processing, wherein the hearing system is configured to determine a confidence parameter resembling a reliability of the audio signal processing by the neural network, and steer the audio signal processing by the neural network based on the confidence parameter.

13. The hearing system according to claim 12, further comprising a mixing unit for mixing a primary audio signal, which is obtained using audio signal processing by the neural network, with a secondary audio signal, which is obtained without using audio signal processing by the neural network.

14. The hearing system according to claim 12, wherein the hearing system is implemented by one or more of a hearing aid, a cochlear implant, or a bone-anchored hearing aid.

15. A neural network for audio signal processing, wherein the neural network is configured to:

perform a regression-based acoustic processing of an audio signal to obtain network output audio data, determine a confidence parameter resembling a reliability of regression-based acoustic processing, and output the confidence parameter and/or to modify the regression-based acoustic processing in dependence of the confidence parameter.

* * * * *